US012472122B2

(12) United States Patent
Wang et al.

(10) Patent No.: US 12,472,122 B2
(45) Date of Patent: Nov. 18, 2025

(54) MASSAGER AND MASSAGING MECHANISM

(71) Applicant: SHENZHEN SVAKOM TECHNOLOGY CO., LTD, Shenzhen (CN)

(72) Inventors: Yongqing Wang, Shenzhen (CN); Zemin Wang, Shenzhen (CN)

(73) Assignee: SHENZHEN SVAKOM TECHNOLOGY CO., LTD, Shenzhen (CN)

( * ) Notice: Subject to any disclaimer, the term of this patent is extended or adjusted under 35 U.S.C. 154(b) by 1118 days.

(21) Appl. No.: 17/395,411

(22) Filed: Aug. 5, 2021

(65) Prior Publication Data

US 2022/0183926 A1 Jun. 16, 2022

(30) Foreign Application Priority Data

Dec. 16, 2020 (CN) ......................... 202023061266.7

(51) Int. Cl.
*A61H 23/02* (2006.01)

(52) U.S. Cl.
CPC . *A61H 23/0263* (2013.01); *A61H 2023/0281* (2013.01); *A61H 2201/1215* (2013.01)

(58) Field of Classification Search
CPC ............ A61H 23/0263; A61H 23/0254; A61H 23/02; A61H 2023/0272; A61H 2023/0281; A61H 2201/1215; A61H 23/006; A61H 2201/149; A61H 2201/1481; A61H 2201/14
See application file for complete search history.

(56) References Cited

U.S. PATENT DOCUMENTS 3,837,335 A * 9/1974 Teranishi ........... A61H 23/0254 601/103
4,079,733 A * 3/1978 Denton .............. A61H 23/0254 601/108
4,827,914 A * 5/1989 Kamazawa ........ A61H 23/0254 601/67

(Continued)

FOREIGN PATENT DOCUMENTS

WO WO-2006072194 A1 * 7/2006 ......... A61H 23/0254
WO WO-2019196400 A1 * 10/2019 ............. A61H 23/02

OTHER PUBLICATIONS

Machine translation of written description and claims of WO2019196400A1 via espacenet (Year: 2019).*

(Continued)

*Primary Examiner* — Timothy A Stanis
*Assistant Examiner* — Tyler A Raubenstraw

(57) ABSTRACT

A massaging mechanism includes a driving member, an eccentric shaft, a guiding member and a pushing member. The driving member has a central shaft; the eccentric shaft is connected to the central shaft of the driving member for being driven by the driving member to rotate; the guiding member defines a guide hole. One end of the pushing member is connected to the eccentric shaft for being driven by the eccentric shaft to rotate around the central shaft, and the other end of the pushing member is slidably received in the guide hole for being driven by the eccentric shaft to extend and retract along an axial direction of the guide hole.

8 Claims, 5 Drawing Sheets

(56) References Cited

U.S. PATENT DOCUMENTS

| | | | | |
|---|---|---|---|---|
| 5,460,597 | A * | 10/1995 | Hopper | A61H 19/30 601/134 |
| 5,716,332 | A * | 2/1998 | Noble | A61H 23/0254 601/111 |
| 7,731,671 | B2 * | 6/2010 | Ting | A61H 7/007 601/99 |
| 9,889,064 | B1 * | 2/2018 | Olivares | A61H 19/40 |
| 10,034,813 | B1 * | 7/2018 | Silver | A61H 7/001 |
| 10,993,873 | B1 * | 5/2021 | Haddock Dicarlo | A61H 1/00 |
| 2003/0158505 | A1 * | 8/2003 | Calvert | A61H 7/005 601/134 |
| 2005/0010141 | A1 * | 1/2005 | Mordechai | A61H 23/0254 601/111 |
| 2005/0222525 | A1 * | 10/2005 | Muchisky | A61H 37/00 601/87 |
| 2007/0150004 | A1 * | 6/2007 | Colloca | A61H 1/008 606/237 |
| 2012/0253245 | A1 * | 10/2012 | Stanbridge | A61H 23/006 601/101 |
| 2013/0060175 | A1 * | 3/2013 | Chen | A61H 7/004 601/108 |
| 2013/0123674 | A1 * | 5/2013 | Carter | A61H 23/0245 601/46 |
| 2013/0283948 | A1 * | 10/2013 | Chen | A61H 7/007 74/89.28 |
| 2014/0163441 | A1 * | 6/2014 | Chen | A61H 7/007 601/111 |
| 2018/0042809 | A1 * | 2/2018 | Zipper | A61H 19/44 |
| 2019/0183725 | A1 * | 6/2019 | Chang | A63B 21/225 |
| 2019/0365598 | A1 * | 12/2019 | Qu | A61H 15/0085 |
| 2020/0046598 | A1 * | 2/2020 | Shen | A61H 1/00 |
| 2020/0390644 | A1 * | 12/2020 | Yang | A61H 15/00 |
| 2020/0405574 | A1 * | 12/2020 | Wersland | A61H 1/008 |
| 2021/0059898 | A1 * | 3/2021 | Wersland | A61H 23/0263 |
| 2021/0196562 | A1 * | 7/2021 | Zhao | A61H 23/006 |
| 2021/0338523 | A1 * | 11/2021 | Zheng | A61H 19/44 |
| 2021/0393475 | A1 * | 12/2021 | He | A61H 19/34 |
| 2023/0355463 | A1 * | 11/2023 | Cirillo-Schmidt | A61H 23/0263 |

OTHER PUBLICATIONS

Machine translation of written description and claims of WO2006072194A1 via espacenet (Year: 2006).*

* cited by examiner

MASSAGER AND MASSAGING MECHANISM

CROSS REFERENCE TO RELATED APPLICATIONS

The present application claims the foreign priority to the Chinese patent application No. 202023061266.7 filed on Dec. 16, 2020 in China National Intellectual Property Administration, and the entire contents of which are hereby incorporated by reference in its entirety.

TECHNICAL FIELD

The present disclosure relates to the field of massaging, and in particular to a massager and a massaging mechanism.

BACKGROUND

As the pace of life increases, working pressure for people also increases. People often work for extra hours to complete work tasks. After a day of intensive work, the human body may be tired, people may generally use a massager to massage the body to relieve fatigue and maintain physical and mental health. The massager in the art may generally be a vibrating massager. A motor may drive an eccentric structure to rotate and generate vibration. The massager may contact a part of the human body that needs to be massaged and may transmit vibration to the human body, achieving a massaging effect.

However, the above-mentioned massager may only perform vibrating massage on a large area of the body, but may not perform a local (small area) vibrating massage. The massaging effect may not be ideal.

SUMMARY OF THE DISCLOSURE

The present disclosure provides a massager and a massaging mechanism to solve the problem of the massager unable to perform massaging on a local area.

According to a first aspect of the present disclosure, a massaging mechanism includes: a driving member, having a central shaft; an eccentric shaft, connected to the central shaft of the driving member for being driven by the driving member to rotate; a guiding member, defining a guide hole; and a pushing member, wherein an end of the pushing member is connected to the eccentric shaft for being driven by the eccentric shaft to rotate around the central shaft, and the other end of the pushing member is slidably received in and extends through the guide hole for being driven by the eccentric shaft to extend and retract along an axial direction of the guide hole.

In some embodiments, the pushing member includes a push rod and a massage column; an end of the push rod is connected to the eccentric shaft, and the other end of the push rod is received in the guide hole; the massage column is connected to an end of the push rod away from the eccentric shaft; and a maximum cross sectional dimension of the massage column is greater than a dimension of the guide hole.

In some embodiments, a surface of the massage column away from the push rod is a curved surface; and a cross sectional dimension of the massage column gradually decreases along a direction away from the push rod.

In some embodiments, the guiding member defines a plurality of guide holes; the pushing member further comprises a support plate, the support plate is connected to an end of the push rod away from the eccentric shaft; the number of massage columns is more than one, the more than one massage columns are arranged on a side of the support plate away from the push rod, and the plurality of guide holes and the more than one massage columns are in one-to-one correspondence, such that each of the more than one massage columns is received in one of the plurality of guide holes.

In some embodiments, the eccentric shaft defines a first assembly hole, an axis of the first assembly hole is spaced apart from an axis of the central shaft; the massaging mechanism further comprises a connecting rod and a connecting member; the connecting rod defines a second assembly hole, the connecting member is received in the second assembly hole and further received in the first assembly hole, such that the connecting rod and the eccentric shaft are rotatably connected.

In some embodiments, a rotating connection portion is arranged on a side of the connecting rod away from the eccentric shaft; the pushing member having a connection ring; and the rotating connection portion is rotatably received in the connection ring.

In some embodiments, the massaging mechanism further includes a first bearing and a second bearing, wherein the first bearing is clamped between the rotating connection portion and the connection ring, and the second bearing is clamped between the connection rod and the connecting member.

In some embodiments, the guiding member defines a plurality of guide holes; the connecting member is a crank shaft; the number of connecting rods is more than one, the more than one pushing members and the plurality of guide holes are in one-to-one correspondence, each of the more than one pushing members is received in one of the plurality of guide holes, and the more than one pushing members are rotatably connected to the crank shaft along a length direction of the crank shaft.

In some embodiments, the crank shaft includes a plurality of sub-crank shafts, and the plurality of sub-crank shafts are detachably connected.

According to a second aspect of the present disclosure, a massager includes: an inner shell, a silicone sleeve, and the massaging mechanism as described in the first aspect. The massaging mechanism is disposed in the inner shell, the inner shell defines an escape hole, the pushing member is received in the escape hole and has a protruded part protruding out of the inner shell from the escape hole; and the silicone sleeve covers the inner shell and the protruded part of the pushing member.

DETAILED DESCRIPTION

Technical solutions in embodiments of the present disclosure will be clearly and comprehensively described by referring to the accompanying drawings. Obviously, the embodiments described herein are only a part of, but not all of, the embodiments of the present disclosure. Based on the embodiments of the present disclosure, all other embodiments obtained by person of ordinary skill in the art without making creative work shall fall within the scope of the present disclosure.

Figure 1:
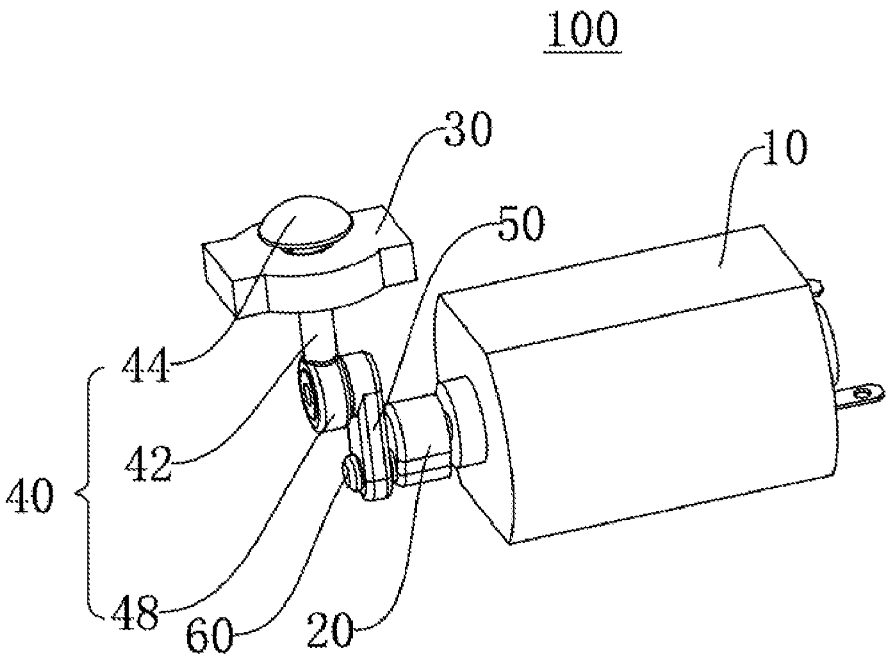
FIG. 1 is a perspective schematic view of a massaging mechanism according to an embodiment of the present disclosure.
Figure 2:
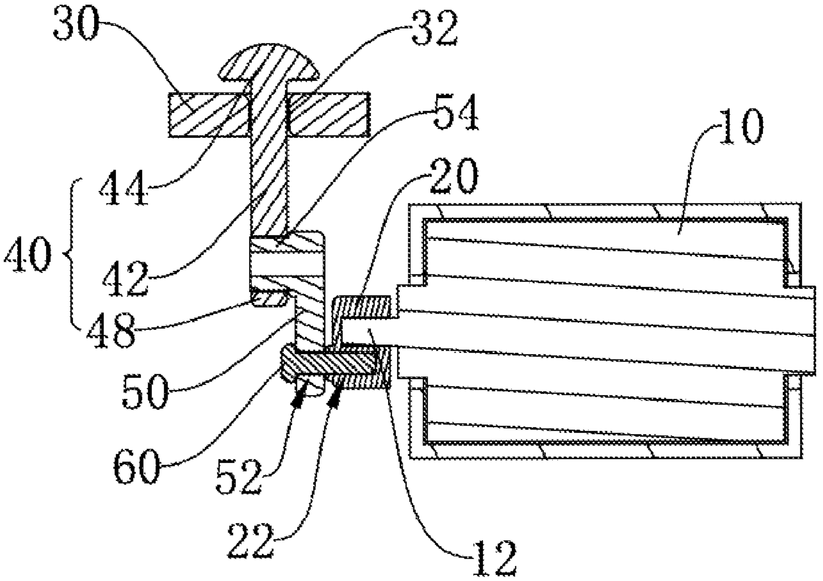
FIG. 2 is a cross sectional schematic view of the massaging mechanism shown in FIG. 1.

As shown in FIG. 1 and FIG. 2, FIG. 1 is a perspective schematic view of a massaging mechanism 100 according to the present disclosure, and FIG. 2 is a cross sectional schematic view of the massaging mechanism 100 in FIG. 1. The present disclosure provides the massaging mechanism 100, the massaging mechanism 100 may include a driving member 10, an eccentric shaft 20, a guiding member 30 and a pushing member 40. The driving member 10 has a central shaft 12. The eccentric shaft 20 may be connected to the central shaft 12 of the driving member 10, such that the driving member 10 may drive the eccentric shaft 20 to rotate. The guiding member 30 defines a guide hole 32. One end of the pushing member 40 may be connected to the eccentric shaft 20 for being driven by the eccentric shaft 20 to rotate around the central shaft 12. The other end of the pushing member 40 may be slidably received in the guide hole 32, such that the eccentric shaft 20 may drive the pushing member 40 to extend and retract along an axial direction of the guide hole 32.

In this way, in the present disclosure, the pushing member 40 may extend through and received in the guide hole 32, and the driving member 10 may be configured to drive the pushing member 40 to extend and retract along the axial direction of the guide hole 32, such that the driving member 10 may intermittently drive the pushing member 40 to extend and retract. As a contact area between the pushing member 40 and the human body is relatively small, the massaging may be performed on a local area of the human body. The massaging may be more targeted, and the massaging effect may be enhanced. In addition, the guiding member 30 may allow the pushing member 40 to move more accurately, preventing the pushing member 40 from shaking when being driven by the driving member 10.

Alternatively, the driving member 10 may be a rotation mechanism, such as a motor, and the central shaft 12 may specifically be a motor shaft of the motor. The eccentric shaft 20 may be connected to the central shaft 12 of the driving member 10, and may be driven by the driving member 10 to rotate. One end of the pushing member 40 may be rotatably connected to the eccentric shaft 20, and a connection position between the pushing member 40 and the eccentric shaft 20 may be spaced apart from the central shaft 12. In this way, the driving member 10 may drive the pushing member 40 to eccentrically rotate around the central shaft 12, and further drive the other end of the pushing member 40 to move along the axial direction of the guide hole 32.

Further, as shown in FIG. 2, the pushing member 40 may include a push rod 42 and a massage column 44. One end of the push rod 42 may be connected to the eccentric shaft 20, and the other end of the push rod 42 may extend through and received in the guide hole 32. The massage column 44 may be connected to the end of the push rod 42 away from the eccentric shaft 20. A maximum cross-sectional dimension of the massage column 44 may be greater than a dimension of the guide hole 32.

In detail, the maximum cross-sectional dimension of the massage column 44 may refer to a diameter of an outer circle of a cross section of the massage column 44 along a direction perpendicular to an axial direction of the push rod 42, and the dimension of the guide hole 32 may refer to a diameter of an outer circle of the guide hole 32. As the maximum cross-sectional dimension of the massage column 44 is greater than the dimension of the guide hole 32, the other end of the pushing member 40 may be prevented from moving out of the guide hole 32 and being damaged when driven by the driving member 10.

When the guide hole 32 is circular, the push rod 42 may be configured to be in a cylindrical shape adapted to the guide hole 32, and the diameter of the guide hole 32 may be equal to the diameter of the push rod 42. In this way, the push rod 42 may fit more tightly with the guide hole 32, and the push rod 42 may be prevented from shaking in the guide hole 32.

Figure 3:
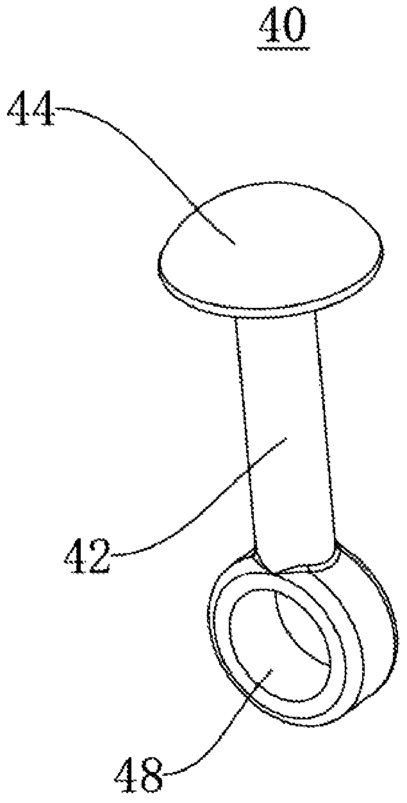
FIG. 3 is a perspective schematic view of the pushing member shown in FIG. 1.

Alternatively, as shown in FIG. 2, and FIG. 3, FIG. 3 is a perspective schematic view of the pushing member 40 in FIG. 1. A surface of the massage column 44 away from the push rod 42 may be a curved surface, and the dimension of the cross section of the massage column 44 may gradually decrease along a direction away from the push rod 42. In this way, the massage column 44 may be mushroom head-shaped to enhance the massaging effect. Alternatively, in another embodiment, the massage column 44 may be in hemispherical.

Figure 4:
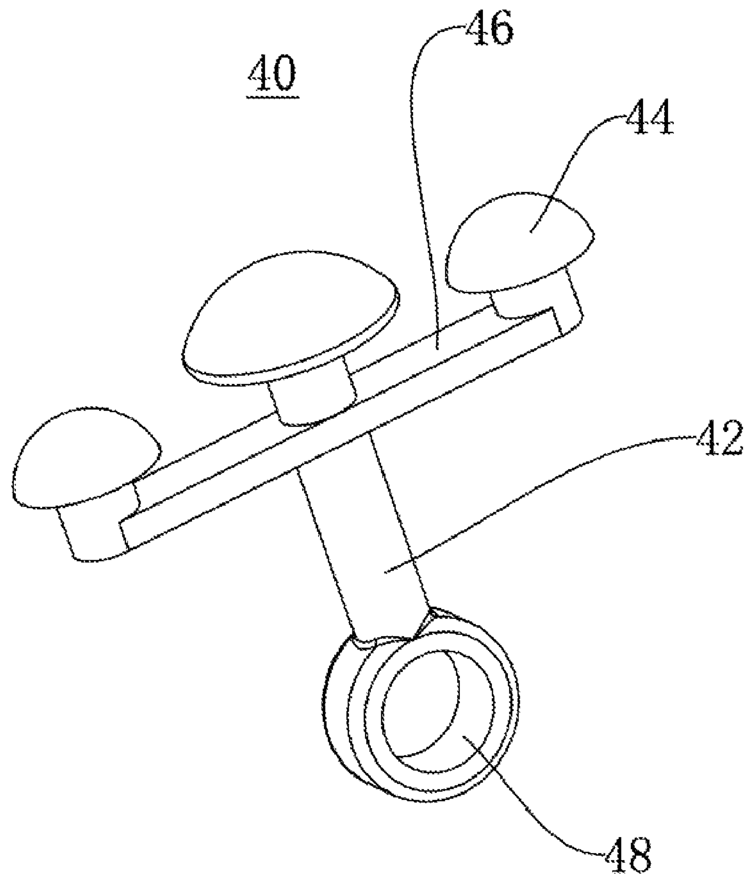
FIG. 4 is a perspective schematic view of a pushing member according to another embodiment of the present disclosure.

Further, the guiding member 30 may define a plurality of guide holes 32, as shown in FIG. 4, which is a perspective schematic view of the pushing member 40 according to another embodiment of the present disclosure. The pushing member 40 may further include a support plate 46. The support plate 46 may be connected to an end of the push rod 42 away from the eccentric shaft 20. The number of massage columns 44 may be more than one. A plurality of massage columns 44 may be disposed on a side of the support plate 46 away from the push rod 42, and may extend through and may be received in the guide hole 32. In this way, while the driving member 10 drives the push rod 42 to extend and retract, the plurality of massage columns 44 that are connected to the support plate 46 may perform massaging synchronously to enhance the massaging effect.

Alternatively, protruded heights of the plurality of massage columns 44 disposed on the support plate 46 protruding relative to the support plate 46 may be equal or unequal, and areas of cross sections of the plurality of massage columns 44 along a direction perpendicular to an axial direction of the massage column may be equal or unequal.

Further, as shown in FIG. 2 and FIG. 3, the eccentric shaft 20 defines a first assembly hole 22. An axis of the first assembly hole 22 may be spaced apart from an axis of the central shaft 12. The massaging mechanism 100 may include a connecting rod 50 and a connecting member 60. The connecting rod 50 may define a second assembly hole 52. The connecting member 60 may extend through, and may be received in the second assembly hole 52 and further received in the first assembly hole 22 for rotatably connecting the connecting rod 50 to the eccentric shaft 20. In this way, when the eccentric shaft 20 is driven by the central shaft 12 to rotate around itself, the eccentric shaft 20 may drive the connecting rod 50 received in the first assembly hole 22 to move eccentrically around the central shaft 12. By configuring the connecting rod 50 to connect the push rod 42 to the eccentric shaft 20, on one hand, rotation of the eccentric shaft 20 may be converted into a linear motion of the push rod 42, and on the other hand, a torque between the push rod 42 and the eccentric shaft 20 may be reduced. In this way, the push rod 42 may move more stably.

Further, as shown in FIG. 1 and FIG. 2, a rotating connection portion 54 may be configured on a side of the connecting rod 50 away from the eccentric shaft 20. A connection ring 48 may be configured on the pushing member 40. The rotating connection portion 54 may be rotatably inserted in the connection ring 48.

In detail, the connection ring 48 may be disposed on an end of the push rod 42 away from the massage column 44 for connecting with the rotating connection portion 54. In this way, a connection structure between the connecting rod 50 and the pushing member 40 may be simplified.

When the connecting member 60 directly extends through and is received in the first assembly hole 22 of the connecting rod 50, and when the connecting rod 50 rotates relative to the connecting member 60, there may be a relatively large frictional resistance between the connecting rod 50 and the connecting member 60. The frictional resistance may abrade the connecting rod 50 and the connecting member 60 to damage the massaging mechanism 100, a relatively large power may be lost, and a driving efficiency of the driving member 10 may be reduced. As the connection ring 48 is inserted into the rotating connection portion 54, when the connection ring 48 rotates relative to the rotating connection portion 54, there may also be a relatively large frictional resistance. The frictional resistance may abrade the connecting rod 50 and the connecting member 60 to damage the massaging mechanism 100, a relatively large power may be lost, and a driving efficiency of the driving member 10 may be reduced.

Therefore, in the present embodiment, the massaging mechanism 100 may further include a first bearing and a second bearing. The first bearing may be clamped between the rotating connection portion 54 and the connection ring 48, and the second bearing may be clamped between the connecting rod 50 and the connecting member 60. In this way, by configuring the first bearing between the rotating connection portion 54 and the connection ring 48, rotation between the rotating connection portion 54 and the connection ring 48 may be more stable, and a loss caused by friction may be reduced. By configuring the second bearing between the connecting rod 50 and the connecting member 60, rotation between the connecting rod 50 and the connecting member 60 may be more stable and smoother to reduce the friction loss.

Figure 5:
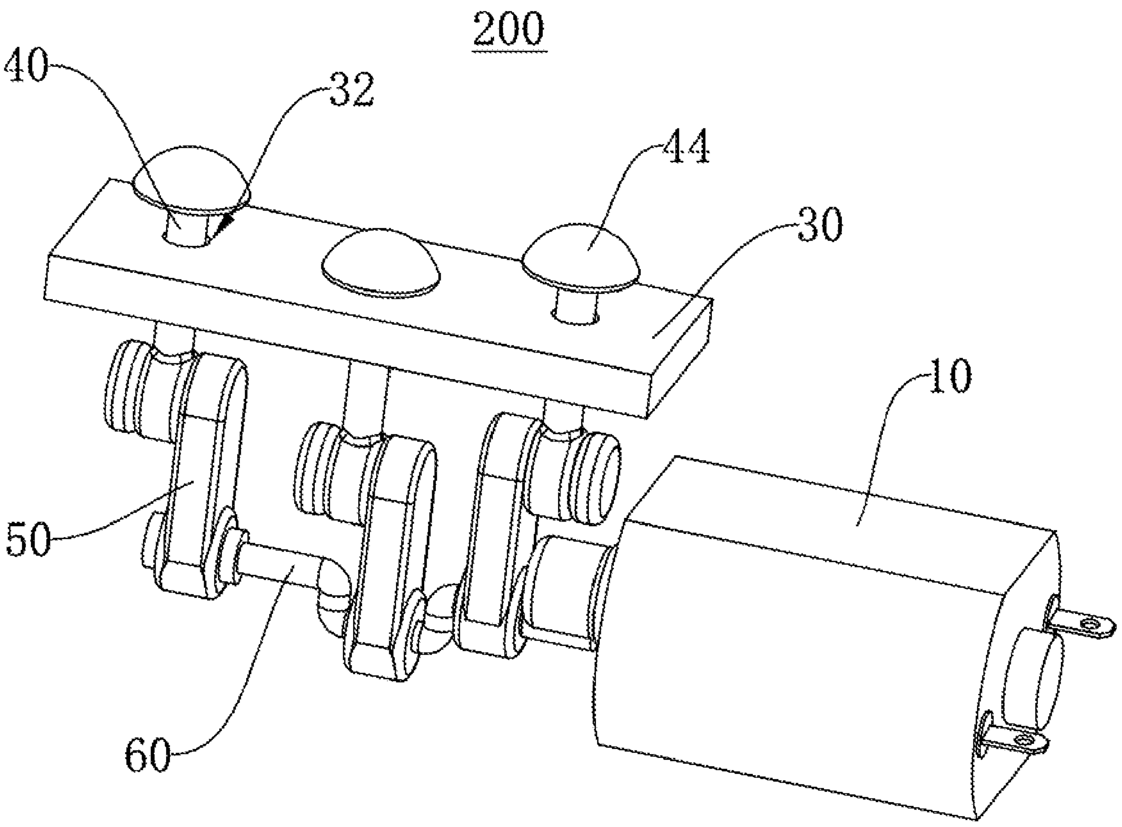
FIG. 5 is a perspective schematic view of a massaging mechanism according to another embodiment of the present disclosure.

As shown in FIG. 5, FIG. 5 is a perspective schematic view of the massaging mechanism 100 according to another embodiment of the present disclosure. The massaging mechanism 200 in the present embodiment may have substantially the same structure as the massaging mechanism 100 in the above embodiment. In the present embodiment, the connecting member 60 may be a crank shaft. The number of connecting rods 50 may be plural. A plurality of pushing members 40 may be received in corresponding guide holes 32, and may be rotatably connected to the crank shaft along a length direction of the crank shaft. When the driving member 10 drives the crank shaft to rotate, the crank shaft may drive the plurality of connecting rods 50 and the pushing member 40 connected with the connecting rods 50 to lift intermittently, and may further drive the massage column 44 to extend and retract relative to the guiding member 30. As the plurality of massage columns 44 are not synchronously lifted, the massaging effect may be enhanced, and a massaging efficiency of the massage columns 44 may be increased.

In the present embodiment, the connecting rod 50 may be made of a material with certain flexibility. In this way, two opposite ends of the connecting rod 50 may connected to the crank shaft and the pushing member 40 respectively in a sleeved manner, processing complexity of the connecting rod 50 may be reduced, and an efficiency of assembling the massaging mechanism 200 may be improved.

Alternatively, in other embodiments, the connecting rod 50 may be made of a rigid material, and the crank shaft may include a plurality of sub-crank shafts. The plurality of sub-crank shafts may be detachably connected. For example, the plurality of sub-crank shafts may be threadedly connected. When connecting the connecting rod 50 to the crank shaft, the connecting rod 50 may be connected to one sub-crank shaft, and rest of the plurality of sub-crank shaft may be connected to form an integral and overall structure.

Figure 6:
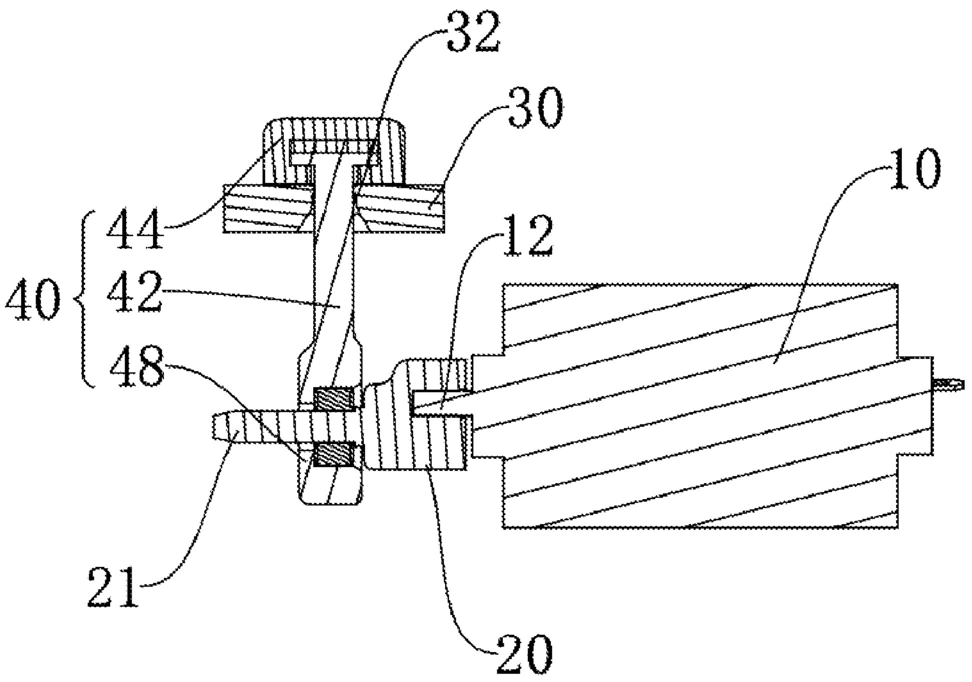
FIG. 6 is a cross sectional schematic view of a massaging mechanism according to another embodiment of the present disclosure.

Further, as shown in FIG. 6, FIG. 6 is a cross sectional schematic view of the massaging mechanism 100 according to another embodiment of the present disclosure. The structure of the massaging mechanism 100 in the present embodiment may substantially be the same as that of the massaging mechanism 100 in the above embodiment. A difference between the above embodiment and the present embodiment refers to connection between the eccentric shaft 20 and the pushing member 40.

In detail, in the present embodiment, a rotation rod 21 may be arranged on a side of the eccentric shaft 20 away from the central shaft 12. An axial direction of the rotation rod 21 may be parallel to the axial direction of the central shaft 12. The connection ring 48 may sleeve the rotation rod 21 and may rotate relative to the rotation rod 21. In this way, when the eccentric shaft 20 rotates eccentrically around the central shaft 12, the rotation rod 21 may be driven to rotate eccentrically around the central shaft 12. The push rod 42 may only move in the axial direction of the guide hole 32 under a position limiting effect of the guide hole 32.

Alternatively, in order to reduce the friction between the connection ring 48 and the rotation rod 21, a rolling bearing may be configured between the connection ring 48 and the rotation rod 21. In this way, the rotation of the connection ring 48 and the rotation rod 21 may be more stable and smoother, and the frictional loss may be reduced.

Figure 7:
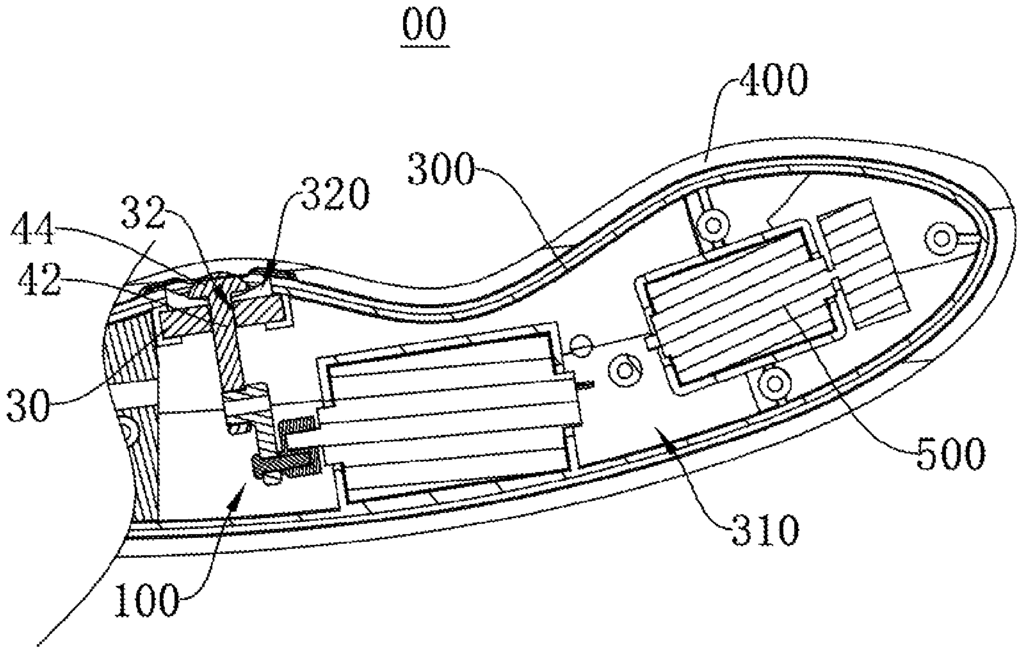
FIG. 7 is a schematic view of a portion of a cross section of a massager according to an embodiment of the present disclosure.

On the basis of the massaging mechanism 100 described in the above embodiments, The present disclosure further provides a massager 00, as shown in FIG. 7, FIG. 7 is a schematic view of a portion of a cross section of the massager 00 according to another embodiment. The massager 00 may include an inner shell 300, a silicone sleeve 400 and a massaging mechanism 100. The massaging mechanism 100 may be disposed in the inner shell 300. The inner shell 300 may define an escape hole 320. The pushing member 40 may extend through and may be received in the escape hole 320, and may protrude out of the inner shell 300 through the escape hole 320. The silicone sleeve 400 may cover the inner shell 300 and a portion of the pushing member 40 that protrudes out of the inner shell 300.

In detail, the inner shell 300 defines a receiving cavity 310. A surface of the inner shell 300 may define the escape hole 320, the escape hole 320 may communicate with the receiving cavity 310. The massaging mechanism 100 may be received in the receiving cavity 310. The guiding member 30 may be fixed on an inner wall of the inner shell 300. The guide hole 32 in the guiding member 30 may align with the escape hole 320 in the inner shell 300. The push rod 42 may be slidably received in the guide hole 32 and escape hole 320. The massage column 44 may be disposed out of the inner shell 300. When the driving member 10 drives the push rod 42 to extend and retract, the massage column 44 may move close to or away from the surface of the inner shell 300. The silicone sleeve 400 may cover the inner shell 300 and the massage column 44 to seal the inner shell 300 and the massaging mechanism 100, and in this way, a surface of the massager 00 may be more soft to be more skin-friendly. When the massage column 44 moves away from the surface of the inner shell 300, the massage column 44 may abut against the silicone sleeve 400 to protrude, and perform massaging on the human body. Further, the silicone sleeve 400 may take elasticity of the sleeve to return close to the surface of the inner shell 300. By configuring the massage column 44 to be mushroom head-shaped, a contact area between the massage column 44 and the silicone sleeve 400 may be increased, such that an area of protrusions out of the silicone sleeve 400 may be increased to improve the massaging effect.

Further, as shown in FIG. 6, the massager 00 may further include a vibration motor 500. The vibration motor 500 may be disposed in the inner shell 300 for intermittently applying a vibration force to the inner shell 300 to drive the inner shell 300 to vibrate to massage the human body. In this way, in the present embodiment, the massager 00 may be configured with the vibration motor 500 for massaging a large area and the massage column 44 for massaging a small area to further enhance the user experience and improve the massaging effect.

The above describes only an implementation of the present disclosure, but does not limit the scope of the present disclosure. Any equivalent structure or equivalent principle transformation made based on the specification and the accompanying drawings of the present disclosure, applied directly or indirectly in other related arts, shall be included in the scope of the present disclosure.

What is claimed is:

1. A massaging mechanism, comprising:
- a driving member, having a central shaft;
- an eccentric shaft, connected to the central shaft of the driving member for being driven by the driving member to rotate;
- a guiding member, defining a guide hole; and
- a pushing member, wherein an end of the pushing member is connected to the eccentric shaft for being driven by the eccentric shaft to rotate around the central shaft, and the other end of the pushing member is slidably extends through the guide hole for being driven by the eccentric shaft to extend and retract along an axial direction of the guide hole;
- wherein the eccentric shaft defines a first assembly hole, an axis of the first assembly hole is spaced apart from an axis of the central shaft;
- the massaging mechanism further comprises a connecting rod and a connecting member;
- the connecting rod defines a second assembly hole, the connecting member is received in the second assembly hole and further received in the first assembly hole, such that the connecting rod and the eccentric shaft are rotatably connected.

2. The massaging mechanism according to claim 1, wherein
- the pushing member comprises a push rod and a massage column;
- an end of the push rod is connected to the eccentric shaft, and the other end of the push rod is received in the guide hole;
- the massage column is connected to an end of the push rod away from the eccentric shaft; and
- a maximum cross sectional dimension of the massage column is greater than a dimension of the guide hole.

3. The massaging mechanism according to claim 2, wherein
- a surface of the massage column away from the push rod is a curved surface; and
- a cross sectional dimension of the massage column gradually decreases along a direction away from the push rod.

4. The massaging mechanism according to claim 1, wherein
- the connecting rod has a rotating connection portion arranged on a side thereof away from the eccentric shaft;
- the pushing member has a connection ring; and
- the rotating connection portion is rotatably received in the connection ring.

5. The massaging mechanism according to claim 4, further comprising a first bearing and a second bearing, wherein the first bearing is clamped between the rotating connection portion and the connection ring, and the second bearing is clamped between the connection rod and the connecting member.

6. A massager, comprising: an inner shell, a silicone sleeve, and a massaging mechanism, wherein
- the massaging mechanism is disposed in the inner shell; wherein, the massaging mechanism comprises: a driving member, having a central shaft; an eccentric shaft, connected to the central shaft of the driving member for being driven by the driving member to rotate; a guiding member, defining a guide hole; and a pushing member, wherein an end of the pushing member is connected to the eccentric shaft for being driven by the eccentric shaft to rotate around the central shaft, and the other end of the pushing member is slidably extends through the guide hole for being driven by the eccentric shaft to extend and retract along an axial direction of the guide hole;
- the inner shell defines an escape hole;
- the pushing member is received in the escape hole and has a protruded part protruding out of the inner shell from the escape hole; and
- the silicone sleeve covers the inner shell and the protruded part of the pushing member;
- wherein the eccentric shaft defines a first assembly hole, an axis of the first assembly hole is spaced apart from an axis of the central shaft;
- the massaging mechanism further comprises a connecting rod and a connecting member;
- the connecting rod defines a second assembly hole, the connecting member is received in the second assembly hole and further received in the first assembly hole, such that the connecting rod and the eccentric shaft are rotatably connected.

7. The massager according to claim 6, wherein
- the connecting rod has a rotating connection portion arranged on a side thereof away from the eccentric shaft;
- the pushing member has a connection ring; and
- the rotating connection portion is rotatably received in the connection ring.

8. The massager according to claim 7, further comprising a first bearing and a second bearing, wherein the first bearing is clamped between the rotating connection portion and the connection ring, and the second bearing is clamped between the connection rod and the connecting member.

* * * * *